United States Patent Office 3,839,529
Patented Oct. 1, 1974

3,839,529
PREPARATION OF POLYAMIDE-IMIDE
FILAMENTS
Carl Serres and James R. Stephens, Naperville, Ill.,
assignors to Standard Oil Company, Chicago, Ill.
No Drawing. Filed Dec. 17, 1971, Ser. No. 209,365
Int. Cl. D01f 7/00
U.S. Cl. 264—205        11 Claims

ABSTRACT OF THE DISCLOSURE

Continuous, abrasion-resistant, polyamide-imide filaments are prepared from a precipitated polymer which has been prepared by the reaction of an acyl halide derivative of trimellitic acid anhydride and an aromatic diamine in a polar solvent, by heating the precipitated polymer at a temperature of about 300° F. to 600° F., dissolving the polymer into an organic solvent, dry spinning the polymer solution and subsequently curing the spun filaments. Useful woven fabrics and non-woven articles may be prepared from the above-made filaments.

BACKGROUND OF THE INVENTION

Amide-imide polymers are a relatively new class of substances known for their solubility in polar organic solvents when in the largely-polyamide form and for their thermal stability when in the cured polyamide-imide form. These polymers can be prepared by the reaction of an acyl halide derivative of trimellitic acid anhydride and an aromatic primary diamine in a polar organic solvent. The polymer prepared via this process contains amide groups and free carboxyl groups and is known as a polyamic acid. This polyamic acid can be fashioned into many forms and shapes and can be subsequently heat treated to an imidized state relatively free from carboxyl groups to produce useful articles of manufacture, such as magnet wire insulation, dielectric films, adhesives, and laminates.

However, this polyamic acid cannot be fabricated into useful filaments and the resultant fibers, fabrics, and felts. This is due to the fact that the polymer, in the polyamic acid form, cannot be spun into a continuous filament, a necessary step in the preparation of useful fibrous articles of manufacture. The polyamide-imide polymer cannot be melt spun because it does not possess a melting point. The polyamic acid as normally prepared, cannot be successfully wet spun or dry spun as the extruded filaments do not possess sufficient strength to allow formation of the long continuous filaments which are necessary for subsequent processing steps. Short segments of polyamide-imide filaments have been produced by wet and dry spinning but these filaments cannot be wound up or collected on godets. Of course, these short filaments cannot be subsequently processed, as by orienting, to filaments or fibers possessing useful properties.

Now it has been discovered that the polyamide-imide polymer, in the polyamic acid stage, can be formed into continuous filaments and successfully collected on godets and processed if the precipitated polyamic acid polymer is heated at a temperature of about 300° F. to 600° F., dissolved in a polar organic solvent, and then dry spun into an inert, gaseous atmosphere. These continuous filaments can be readily oriented and cured into filaments or fibers possessing good mechanical properties, high thermal stability and outstanding abrasion resistance. These cured and usually oriented filaments can be manufactured into numerous useful fibrous articles such as woven fabrics and non-woven felts.

SUMMARY OF THE INVENTION

This invention relates to a process for the preparation of thermally stable polyamide-imide filaments, which possess good mechanical properties and excellent abrasion resistance, from a water precipitated and water washed polymer which has been prepared by reacting essentially equimolar quantities of an aromatic primary diamine and an acyl halide derivative of trimellitic acid anhydride which contains at least one acyl halide group with that in the 4-ring position, in a polar organic solvent, for a time and at a temperature below 150° C. sufficient to produce a polymer substantially in the polyamic acid form. This process involves (1) heating the precipitated polymer at a temperature between about 300° F. and 600° F.; (2) dissolving the heated polymer into a polar organic solvent at such a concentration that the solution viscosity of the resulting solution is at least 1500 poises, preferably between 2000–2500 poises, when measured at 25° C.; (3) spinning the polymer solution into a gaseous atmosphere which is maintained at a temperature of at least 450° F.; and (4) curing the spun filaments at a temperature above 300° F. for a time sufficient to convert substantially all of the carboxyl and amide groups available for further reaction to imide groups. This invention also relates to processes for the curing and orientation of the spun polyamide-imide filaments.

This invention further relates to novel articles of manufacture which can be prepared from these polyamide-imide filaments, in particular fabrics prepared by weaving or knitting the filaments or fabrics, or non-woven articles or felts which have been prepared by interlocking the fibers through the use of pressure, needles or heat. These novel articles which are prepared from the filaments made by the process of this invention possess outstanding thermal properties and abrasion resistance in addition to good physical properties. These articles are useful for many fiber applications which demand high-temperature properties, such as, cable wrappings, conveyor belts, and, in particular, fire-proof or fire-resistant drapes, rugs, and upholstery especially for industrial and institutional use.

DESCRIPTION OF THE INVENTION

The polyamide-imides useful in the preparation of the filaments of this invention are prepared by reacting an acyl halide derivative of trimellitic acid anhydride which contains at least one acyl halide group with that being in the 4-ring position with aromatic primary diamines in polar organic solvents at temperatures below 150° C. The resulting products are polyamides, known as polyamic acids, wherein the linking groups are predominantly amide groups although some may be imide groups, and wherein the structure contains free carboxylic acid groups which are capable of further reaction with amide groups to form imide rings. These polyamic acids are polymeric substances having in their molecules units of

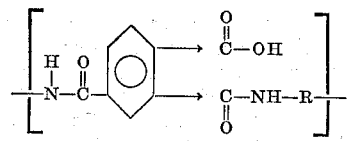

wherein → denotes isomerism, the free carboxyl groups are *ortho* to one amide group and R is a divalent hydrocarbon radical. This hydrocarbon radical may be a divalent aromatic hydrocarbon radical of from 6 to about 10 carbon atoms, or two divalent aromatic hydrocarbon radicals of from 6 to about 10 carbon atoms joined directly or by stable linkages such as $-O-$, $-CH_2-$, $-\underset{\underset{O}{\|}}{C}-$, $-S-$, $-SO_2-$ and $-S-$;

for example,

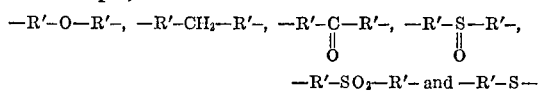

wherein R' is the said divalent aromatic hydrocarbon radical. The polyamic acids as formed are imidized up to about 50 percent of theoretical imide content, preferably about 30 percent or less.

These polyamic acids are capable of substantially complete imidization through heating by which they form a polyamide-imide structure having to a substantial extent reoccurring units of

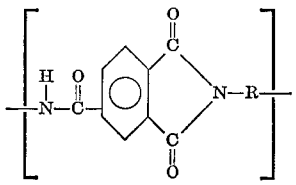

wherein one carbonyl is *meta* to and one carbonyl is *para* to each amide group and wherein R is defined as above. The polyamide-imides after imidization theoretically contain an equal number of amide and imide groups.

The polyamic acid polymers useful in this invention are prepared from acyl halide derivatives of trimellitic acid anhydride. The acyl halide derivatives of trimellitic acid anhydride which are useful are those which contain at least one acyl halide group with that being in the 4-ring position. Preferably, the acyl halide derivative is the 4-acid chloride of trimellitic acid anhydride, 4-trimellitoyl chloride anhydride.

The primary diamines useful in this invention are wholly- or largely-aromatic primary diamines. More particularly, they are aromatic primary diamines containing from 6 to about 10 carbon atoms or aromatic primary diamines composed of two divalent aromatic moieties of from 6 to about 10 carbon atoms, each moiety containing one primary amine group, with the moieties linked directly or through bridging groups such as

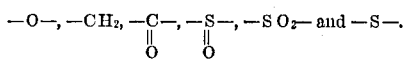

Among the aromatic primary diamines useful in this invention are *meta*-phenylenediamine, 4,4'-diaminodiphenylether, 4,4'-diaminodiphenylmethane, 4,4'-diaminodiphenylsulfone and 4,4'-diaminodiphenylsulfide. Preferably the aromatic primary diamine is 4,4'-diaminodiphenylether. These aromatic primary diamines may be reacted with the anhydride-containing substance either individually or as mixtures of two or more of the above diamines. The aromatic nature of the diamine provides the excellent thermal properties of the resulting polymers while the primary amine groups permit the desired imide rings and amide linkages to be formed.

Usually the polymerization is carried out in the presence of a polar organic solvent such as N-methylpyrrolidone, N,N-dimethylacetamide, ortho, meta, or para cresols, or a mixture of cresols such as commercially available Cresylic 9PX (Pitt-Consol Chemical Co.) The preferred solvent is N,N-dimethylacetamide. The polymerization should be carried out under substantially anhydrous conditions and at a temperature below about 150° C. Advantageously, the reaction is carried out from about 20 to 60° C.

The reaction time is not critical and depends primarily on the reaction temperature. It may vary from about 1 to about 24 hours, with about 2 to 6 hours at about 30 to 60° C. preferred for the nitrogen-containing solvents.

To maintain anhydrous conditions during the reaction, a slow flow of an inert gas such as nitrogen or carbon dioxide is used. The flow rate of the gas should be adjusted such that little solvent is removed from the reaction zone.

The primary diamine-containing substance and the anhydride-containing substance are preferably present in essentially an equimolar ratio. Variations of up to about 3 mole percent in either direction do not substantially affect the resulting polymer. Beyond this percentage in either direction the physical properties of the resulting polymer decrease substantially.

At this stage the polyamic acid contains an entrained hydrogen halide which is productd by the reaction of the acyl halide derivative with the primary diamine. This hydrogen halide must usually be removed for most end use applications. One means for accomplishing this is to treat the polyamid acid solution with an alkylene oxide, such as ethylene oxide or propylene oxide, which reacts with the entrained hydrogen halide to form a compound which can be volatilized off during the imidization or curing reaction. While this is advantageous for such end use applications as wire enamels and laminates, the properties for other applications such as free films are sometimes insufficient.

The entrained hydrogen halide may also be removed by precipitating the polyamic acid solution into distilled water, removing the liquid, and washing the particles of precipitated polymer with additional distilled water until the wash water has a pH of about 4 to about 5. Undistilled water may be used but the polymer absorbs the cations present therein which can, if their concentration is sufficiently high, deteriorate the properties of the polymer.

The precipitated and washed polymer particles are then usually dried at temperatures between about 70 to 220° F. to remove most of the entrained water. The dried polymer generally contains about 5–10 percent water on a total weight basis. The polymer produced this way when reformulated, has excellent properties, especially for applications such as free films.

But, the polymer, whether treated with an alkylene oxide or precipitated into water, is incapable of being spun into continuous filaments either by dry spinning or wet spinning. Filaments can be extruded, but they do not have sufficient strength to be wound up on the godets. Much filament breakage takes place and only short filaments of from a few inches to a few feet can be obtained. These short filaments cannot be subjected to the normal post-spinning operations such as orientation and therefore good fiber properties cannot be developed.

However, if the particles of the precipitated polyamic acid polymer are heated at a temperature between about 300 and 600° F. for about 0.5 to 4 hours, preferably between about 350–450° F. for about 0.75 to 3 hours, the resulting polymer, when reformulated into a polar organic solvent, can be dry spun into continuous filaments which have a strength sufficient to permit them to be wound up on godets and subsequently cured and oriented. This heat treatment generally takes place in an inert gas or air atmosphere. It is believed that the success of this heat treatment step in permitting continuous filament formation is due to an aggregation of the macromolecules of the polymer. This aggregation depends primarily on the heating time and temperature employed and on the initial molecular weight of the polymer. During this heating step a significant degree of imidization occurs, although the polymer is still far from fully cured and is still soluble in the usual polar organic solvents.

After this heat treatment, the polymer is dissolved into any polar organic solvent in which the polymer is soluble. Among these are the solvents which were mentioned above as being useful for the initial polymerization. Again, the preferred solvent is N,N-dimethylacetamide. This dissolution is best accomplished by rapidly stirring or blending the polymer particles into the polar organic solvent under an inert gas blanket. The inert gas blanket is used to reduce the water pickup by the very hydroscopic solvents.

The solution viscosities of these polymer solutions, to be useful for spinning, should be about 1500-4000 poises, preferably about 2000-2500 poises. These solution viscosities are measured by a Brookfield viscometer at 25° C. Viscosities above about 3000 poises, although useful for the purposes of this invention, require high pressure to force the polymer through the spinneret orifices.

The percent polymer in these solutions is usually adjusted to facilitate the proper solution viscosity. However, the percent solids usually ranges between about 20 and 35 percent with 23-36 percent solids being more typical.

The heated, redissolved polyamic acid solution can then be dry spun into continuous filaments. The polymer solution is extruded through spinneret orifices into a heated spinneret column which is continually being swept by a steady cocurrent stream of a dry gas, usually nitrogen or air. Generally, the temperature is maintained between about 450 and 650° F., preferably about 525-600° F. The filaments are collected from the spinning column at a rate of about 300-600 ft./min. These spinning conditions depend primarily on capacity of the column to remove the solvent and are subject to some variation. Filaments prepared in this manner contain some residual solvent and have a low degree of polymer cure. However these filaments possess a strength which is sufficient to allow them to be continuously collected on godets and thereafter cured and oriented. The collected filaments are of 30-40 denier.

After the continuous polyamide-imide filaments have been collected, they are usually subjected to various post-spinning operations which generally must be performed in order to obtain polyamide-imide filaments or fibers with good mechanical properties. The common post-treating steps are precuring, curing, fiber orientation or drawing, and post-curing. These steps need not be carried out in any fixed sequence and several variations are possible without departing from the scope of the invention.

The filaments may be precured to remove additional solvent and to increase the strength of the filaments. The precuring is accomplished by heating the filaments in an oven at a temperature between 300-450° F., for about 15 minutes to 3 hours, preferably 325-400° F. for about 30 minutes to 2 hours. This precuring is generally accomplished by placing spools of wound filaments directly into an oven without applying any tension to the filaments. The polyamide-imide filaments can also be precured in a continuous manner usually with a shorter time of exposure to the elevated temperatures. This precuring improves the tensile properties of the filaments; and while final fiber properties are not appreciably affected, the fibers are stronger after precuring than they are after removal from the spinning column. This makes the filaments much easier to handle during the subsequent orientation and curing steps, and significantly reduces filament breakage.

While the curing of the polyamide-imide filaments can be accomplished at temperatures as low as 300° F. it is generally carried out in a continuous manner in a curing oven at a temperature between about 450-750° F., preferably between about 475-675° F. The oven residence time may range from up to a few minutes to as little as 2 seconds, preferably from 10 to 40 seconds. The residence time is, of course, somewhat temperature dependent as the higher the temperature the shorter the time required to reach a certain degree of cure. The filaments can also be cured by placing spools of uncured filaments in an oven maintain in the above-mentioned temperature range for from a few minutes up to 2 hours or more.

In order to produce a polyamide-imide filament or fiber with good physical properties, it is usually necessary to orient or draw the fiber. The polyamide-imide filaments, as spun, have been determined by X-ray defraction to be unoriented and non-crystalline. The cured, unoriented polyamide-imide filaments made according to the process of this invention have straight tenacity values of only about 1.0 gram/denier (g./d.). Generally, the orientation or drawing is accomplished by stretching the filaments at least 1.4, advantageously from about 1.7 to 3 or higher, times their original length while maintaining the filaments at an elevated temperature. Fibers oriented by stretching about 2 times their original length have been found by X-ray defraction to be oriented and crystalline.

A preferred method for post-treating the polyamide-imide continuous filaments is to orient the filaments during the curing step. Filaments drawn 2X or 2.4X at a cure temperature of 600-690° F. with a residence time of about 24 sec. in an 8 ft. oven had straight tenacity values of from 3.1 to 4.1 g./d. and elongations at break of from 12 to 18 percent.

An even more advantageous process for post-treating consists of precuring the filaments at a temperature of about 325-400° F. and subsequently drawing the filaments during the curing step at a temperature of about 475-650° F.

Drawing or orientation can also be accomplished during the precuring step, prior to curing. However, fibers oriented in this manner tend to have tensile properties inferior to those oriented at the temperature used for curing.

The filaments and fibers of this invention may also be post-cured after orientation to insure that the polymer is fully imidized. This may be advantageous as some of the mechanical properties of the fibers, such as tenacity and tensile factor, do not fully develop unless the fibers have been highly cured. The temperatures useful for curing can be used here with the time of post-cure varying from about 2 min. to 2 hrs. or more. The polyamide-imide filaments and fibers may be post-cured before fabrication into useful articles of manufacture, or after the fibers have been woven into fabrics or cloth or processed into non-woven fabrics or felts.

The polyamide-imide filaments of this invention are of normal textile denier, in the range of 5 to 10 or more denier per filament. The filaments can be of various shapes. The filaments may be modified by typical fiber additives such as dyes, pigments, anti-static agents and the like. These additives may be applied after spinning or may be included directly into the spinning solution. The continuous filaments of this invention possess an extremely high level of abrasion resistance when measured by a standard test. The Walker Abraser test is designed to measure the abrasion resistance of fiber against fiber by rubbing fibers against each other under a constant load. The number of cycles for fiber breakage is the measure of average resistance. Walker Abraser average values of 3,100 cycles were obtained for the polyamide-imide fibers of this invention. In comparison, polypropylene fibers, which are known for their good abrasion properties, have an average resistance of about 340 cycles.

The polyamide-imide filaments of this invention may be assembled into various forms, such as yarns, tows or other filamentary bundles. These filaments may be made into loose fibrous masses but they are preferably processed into fabrics such as by weaving the fibers, or yarns made from the fibers, on conventional weaving equipment or by knitting the fibers either by weft or warp knitting techniques or the like. The filaments, fibers, or yarns of this invention may also be processed into non-woven articles or felts, such as needle-loomed felts which are produced by mechanically interlocking the fibers under the influence of barbed needles. Fabrics and felts made in this manner possess good physical properties ad excellent abrasion resistance and thermal properties. These articles are useful in many fiber applications which require good thermal and abrasion-resistant properties. Among the uses for the fabrics and felts of this invention are high-temperature electrical insulation, cable wrappings, clothing for persons who need protection from short exposure at elevated temperatures, and conveyor belts for curing ovens. In particular, the filaments and articles of this invention are useful in fire-proof or fire-resistant rugs, drapes, and upholstery for industrial, office, and institutional use. The articles are also useful in automobiles and airplanes to meet the stricter fire safety standards being developed in these areas.

The properties of these polyamide-imide filaments are indicated in the examples below. The properties reported were determined as follows:

The tensile properties of the filaments were determined with a Model TM Instrom tester operating with one-inch long specimens at a jaw separation rate of 2 in./min. Tenacity and elongation at break were measured conventionally. The tensile factor of the filaments was calculated as the product of the tenacity and the square root of the elongation. The tensile properties of multi-filament yarns were obtained by measuring the properties of each of the filaments in a cross section of the yarn and taking the average of the values as the reported measurement.

The knot strength and loop strength of the filaments were determined according to ASTM Method D 2256. The wet strength of the filaments was determined by immersing the fibers in water at 72° F. for 48 hours and determining the value according to ASTM Method D 2256.

The percent tenacity retained after exposure of the filaments to elevated temperatures for 100 hours was determined by measuring the tenacity of five specimens before and after the exposure. The reported value was determined by dividing the average value for the specimens after exposure by the average value for the specimens before exposure and multiplying by 100.

The strength of the filaments in boiling water was determined by measuring the lengths of 5–10 in. sections of fiber before and after immersion in boiling water for 30 minutes.

EXAMPLE I

Into a stirred, glass reactor equipped with a nitrogen purge, was added 1,360 g. of N,N'-dimethylacetamide (DMAC) and 240.0 g., of 4,4'-diaminodiphenylether. Then, 253.0 g. of 4-trimellitoyl chloride anhydride (4-TMAC) was added in portions over a one-hour period at 35° C. After the addition was completed, the temperature of the polymer solution was raised to 50° C. and maintained there for one hour. The polymer solution was then cooled and allowed to stand at room temperature for 16 hours. The polymer solution was then poured into distilled water to precipitate the polymer. The precipitated polymer particles were then further washed with distilled water until free of hydrogen chloride, and air dried at room temperature by drawing air through the polymer contained in a Buchner funnel. The polymer was further dried in a vaccum oven at 50° C. This polymer had an intrinsic viscosity of 0.50 dl./g. as determined in DMAC at 25° C. using a Cannon-Fenske viscometer. This air-dried polymer was then spread in a thin layer on a tray and heated in an air circulating oven for one hour at 350° F. This polymer was then dissolved in DMAC at 25 percent solids. The solution viscosity was 2,250 poises (p.) when measured with a Brookfield viscometer. This polymer solution was spun through a flat-faced spinning head having 5 orifices, 8 mils in diameter, into a 16 ft. spinning column maintained at a temperature of about 550° F. The polymer flow rate was 7.7 g./min. The emerging filaments were strong enough to be wound on a godet and were collected at a rate of 385 ft./min. These continuous filaments were precured in an oven for 30 min. at 350° F. and were final cured at 600° F. for various times and at various draw ratios. The filaments of this example were statically drawn, that is, one end of each filament was attached to a horizontal bar while the other end was attached to a weight. Certain physical properties of filaments obtained at various draw ratios at a constant final cure of 3 min. at 600° F. are shown in Table I.

TABLE I

| Draw ratio: | Tenacity, grams/denier (g./d.) | Elongation at break, percent |
|---|---|---|
| 1.2 | 0.9 | 88 |
| 2.0 | 4.2 | 23 |
| 2.4 | 4.5 | 21 |
| 2.8 | 4.8 | 20 |

Certain physical properties of filaments cured for various times at 600° F. are shown in Table II.

TABLE II

| Curing time at 600° F. (min.): | Draw ratio | Tenacity (g./d.) | Elongation at break, percent |
|---|---|---|---|
| 3 | 2.8 | 4.8 | 26 |
| 5 | 2.6 | 5.8 | 25 |
| 10 | 2.7 | 6.8 | 20 |

Some additional physical properties of fibers prepared with the 10 min. final cure at 600° F. and at a draw ratio of 2.7 are shown in Table III.

TABLE III

Initial Modulus, g./d. _____ 67.0
Tenacity:
    At 170° F., percent of original _____ 93
    At 300° F., percent of original _____ 77
Knot Strength, g./d. _____ 5.1
Wet Strength in Water (48 hours at 72° F.), g./d. __ 3.9
Shrinkage in Boiling Water _____ None The abrasion resistance of these fibers was measured with a Walker Abraser and on the average the fibers broke after 3,100 cycles. Polypropylene fibers tested at the same time broke on the average after 340 cycles.

EXAMPLE II

A solution of 4.80 lbs. of 4,4'-diaminodiphenylether in 23.0 lbs. of DMAC was prepared in a stirred, 5-gallon, glass-lined reactor maintained under a nitrogen blanket. Then, 5.05 lbs. of 4-TMAC was added in portions over a one-hour period at 35–42° C. Additional DMAC, 4.6 lbs., was added. The temperature of the reaction solution was raised to 50° C. and maintained at that temperature for two hours with continuous stirring. The solution was then drained from the reactor and the polymer precipitated into distilled water in a Model D, Fitz Mill, a comminuting machine manufacture by W. J. Fitzpatrick Co. The wet precipitated polymer particles were washed free of entrained hydrogen chloride with distilled water until the washed solution had a pH of 4–5. The wet polymer particles were partially dried by centrifugation and then dried by heating at 60° C. in a steam heated, circulating air, hot box oven for two days. The percent solids, measured at 500° F. for 15 minutes was 92.2 percent. This polymer had an intrinsic viscosity of 0.42 dl./g. as determined in DMAC at 25° C. using a Cannon-Fenske viscometer.

Another polymerization reaction was carried out exactly as above. The final, dry, solid polymer had a measured percent solids of 9.5 percent and had an intrinsic viscosity of 0.42 dl./g.

Six pounds of each of the polymers produced in the above two polymerization reactions were blended together for use in the preparation of fiber spinning solutions. A solution of this polymer was prepared in DMAC at 44 percent solids. This solution had a Brookfield viscosity of 3,900 poises (p.).

This solution was spun through a flat-faced spinneret head having 16 orifices, 10 mils in diameter, into a 16 ft. column maintained at a temperature of about 550° F. Short filaments ranging from a few inches to a few feet were formed. Continuous filaments could not be obtained.

The viscosity of the polymer solution was reduced to about 2,500 p. by the addition of DMAC. This solution was extruded in the same equipment and under the same conditions. Again continuous filaments, capable of being wound up and processed, were not obtained. Short filaments were again obtained.

EXAMPLE III

This example illustrates that the polyamide-imide polymer of Example II can be heat treated so that the polymer is capable of forming continuous filaments.

The dried, blended polymer of Example II was heat treated in the following manner. Thin layers of the dry, blended polymer were heated in a hot-air oven for 60 min. at 400° F. These polymers were then dissolved under a nitrogen atmosphere into DMAC as rapidly as they could be mixed. The solution viscosity attained at this point was 4,000 p. at 25 percent solids. The solution was diluted to 2,500 p. by addition of DMAC. These polymers were extruded through the same equipment and under the same conditions as in Example II. In this case however, continuous filaments were obtained which were strong enough to be wound up on the godets. The filaments, which were collected at about 385 ft./min., were about 30-40 denier.

EXAMPLE IV

This example illustrates, typical properties that can be obtained when the polyamide-imide filaments are oriented in a continuous manner.

A. Orienting During Cure, No Precure

Five filament yarns prepared as in Example III were continuously cured and oriented by passing the filaments over a heated godet maintained at 350° F. and then through an 8 ft. heated oven at a rate of 2.5 ft./min. These filaments were not precured. The draw ratios and temperatures of curing are shown, along with physical properteis, in Table IV.

TABLE IV

[Tensile properties of fibers continuously oriented and cured at high temperatures without precuring]

| | Cure temp. (° F.) | Tenacity (g./d.) | Elongation at break, percent |
|---|---|---|---|
| Draw ratio: | | | |
| 2.0 | 600 | 3.5 | 18 |
| 2.0 | 645 | 3.1 | 14 |
| 2.0 | 690 | 3.1 | 13 |
| 2.4 | 600 | 3.8 | 12 |
| 2.4 | 645 | 4.1 | 13 |

It will be noted that the cure temperature did not greatly affect the tenacity of the yarn over the cure range studied.

B. Orienting During Cure With Precure

Five filament yarns prepared as in Example III were wound on a metal tube which was placed in an oven at 350° F. for a precure of 30 min. No fusion of the filaments occurred during this precure. The filaments were then oriented and cured at 600° F. At a draw ratio of 2.0, the cured filaments had a tenacity of 3.5 g./d. and an elongation at break of 14%. These values are essentially identical to the values obtained for the same conditions in A above. Thus, the precuring did not improve the final fiber tensile properties. However, the fibers had more strength after the precure than they had after removal from the spinning column. This makes the fibers much easier to handle in subsequent orienting and curing steps.

C. Orienting While Precuring, Followed by Curing

Polymer prepared as in Example II but heat treated for 75 min. at 400° F. was dissolved in DMAC at 24 percent solids. The solution viscosity was 2,100 p. Five filament yarns spun from this polymer were precured at 350° F. and then drawn at a draw ratio of 1.9 through an 8 ft. oven at 350° F. at a rate of 2.5 ft./min. The drawn yarns were wound on a metal tube and heated at 600° F. in an oven for 10 min. Oriented cured filaments prepared in this manner had adequate tensile properties, but properties inferior to those of filaments oriented and cured at 600° F.

EXAMPLE V

This example illustrates the effect of the final cured temperature on polymer physical properties.

Polymer was prepared as in Example II and was heat treated and spun as in Example IVB. Five filaments yarns of 40 denier prepared in this manner were precured without tension at 350° F. The fibers were drawn at a draw ratio of 1.9 while being heat treated at the temperatures indicated in Table V at a feed rate of 2.5 ft./min. through an 8 ft. oven. The effect of the cure temperature on the yarns' tenacity, elongation at break and tensile factor is indicated in Table V below.

TABLE V

[Tensile properties of fibers of AI polymer oriented and cured at various temperatures]

| | Tenacity (g./d.) | Elongation at break, percent | Tensile factor |
|---|---|---|---|
| Cure temp. (° F.): | | | |
| 525 | 5.2 | 25 | 26 |
| 600 | 5.3 | 21 | 24 |
| 625 | 5.2 | 18 | 22 |
| 655 | 5.1 | 18 | 22 |
| 700 | 4.8 | 16 | 19 |

The data indicates that the fiber properties are about the same at all cure temperatures indicated except 700° F. where a noticeable drop in tensile properties occurred.

EXAMPLE VI

This example shows the effect of the draw ratio on polymer physical properties.

Five filament yarn of 40 denier was prepared as in Example V. This yarn was precured without tension at 350° F. and was drawn during the curing step at 600° F. through an 8 ft. oven at 2.5 ft./min. at the draw ratios indicated in Table VI. Physical properties of these variously drawn yarns are shown in Table VI below.

TABLE VI

[Properties of yarns oriented with varying draw ratios]

| Draw ratio | 1.5 | 1.7 | 1.9 | 2.1 | 2.4 |
|---|---|---|---|---|---|
| Tenacity, g./d | 3.3 | 5.0 | 5.3 | 5.3 | 6.4 |
| Elongation at break, percent | 28 | 31 | 21 | 20 | 16 |
| Tensile factor | 18 | 28 | 24 | 24 | 26 |
| Initial modulus, g./d | | 48 | 61 | 57 | |
| Wet strength, g./d | | 4.3 | 4.2 | 5.2 | |
| Shrinkage in boiling water, percent | | 0 | 0 | 0 | |
| Tenacity retained after— | | | | | |
| 100 hrs. at 360° F., percent | | 93 | 95 | 101 | |
| 100 hrs. at 580° F., percent | | 75 | | 82 | |

What is claimed is:

1. A process for preparing abrasion-resistant, thermally stable polyamide-imide filaments from the water precipitated and washed polymer prepared by reacting essentially equimolar quantities of an acyl halide derivative of trimellitic acid anhydride which contains at least one acyl halide group with that in the 4-ring position and an aromatic primary diamine, in a polar organic solvent, for a period of time and at a temperature below 150° C. sufficient to produce a polymer substantially in the polyamic acid form, which process comprises:

(1) heating the precipitated polymer at a temperature between about 300° F. to 600° F.;

(2) dissolving the heated polymer into a polar organic solvent at such a concentration that the solution viscosity of the resulting solution is at least about 1500 poises when measured at 25° C.;

(3) spinning the polymer solution into a gaseous atmosphere which is maintained at a temperature of at least 450° F.; and (4) curing the spun filaments for a time and at a temperature above 300° F. sufficient to convert substantially all the carboxyl and amide groups available for further reaction to imide groups.

2. The process of Claim 1 wherein the acyl halide derivative of trimellitic acid anhydride is 4-trimellitoyl chloride anhydride.

3. The process of Claim 2 wherein the aromatic primary diamine is 4,4'-diaminodiphenylether.

4. The process of Claim 2 wherein the polar organic solvent is N,N-dimethylacetimide or N-methylpyrrolidone.

5. The process of Claim 1 wherein the water precipitated and washed polymer is dried at a temperature between 70° F. and 220° F. before it is heat treated.

6. The process of Claim 1 wherein the precipitated polymer is heated at a temperature of about 350° F. to 450° F.

7. The process of Claim 1 wherein the solution viscosity of the dissolved polymer solution is between about 2000 and 2500 poises.

8. The process of Claim 1 wherein the filaments are cured at a temperature between about 475° F. and 675° F.

9. The process of Claim 8 wherein the filaments are heated, prior to being cured, at a temperature between about 300°–450° F. for from 15 minutes to 3 hours.

10. The process of Claim 8 wherein the filaments are oriented during cure by stretching the filaments at least about 1.4 times their original lengths.

11. The process of Claim 10 wherein the filaments are oriented while curing by stretching the filaments from about 1.7 to 3.0 times their original lengths.

References Cited
UNITED STATES PATENTS

| | | | |
|---|---|---|---|
| 3,573,260 | 3/1971 | Morello | 264—331 |
| 3,624,050 | 11/1971 | Strickrodt | 260—78 TF |
| 3,661,832 | 5/1972 | Stephens | 260—78 TF |
| 3,705,869 | 12/1972 | Darmory et al. | 260—78 TF |
| 3,705,870 | 12/1972 | Darmory et al. | 260—78 TF |
| 3,717,696 | 2/1973 | Rochino et al. | 264—205 |
| 3,673,160 | 6/1912 | Buisson et al. | 264—184 |

JAY H. WOO, Primary Examiner

U.S. Cl. X.R.

260—78 TF; 264—210 F, 236